United States Patent
Florencio et al.

(10) Patent No.: US 7,925,883 B2
(45) Date of Patent: Apr. 12, 2011

(54) ATTACK RESISTANT PHISHING DETECTION

(75) Inventors: Dinei A. Florencio, Redmond, WA (US); Cormac E. Herley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1210 days.

(21) Appl. No.: 11/360,900

(22) Filed: Feb. 23, 2006

(65) Prior Publication Data

US 2007/0005984 A1    Jan. 4, 2007

(51) Int. Cl.
*H04L 9/00* (2006.01)

(52) U.S. Cl. .................................................. 713/178

(58) Field of Classification Search .................. 713/178
See application file for complete search history.

(56) References Cited

U.S. PATENT DOCUMENTS

| | | | |
|---|---|---|---|
| 6,044,152 A | 3/2000 | Mendolia | |
| 6,104,916 A | 8/2000 | Steinhoff et al. | |
| 6,230,269 B1 | 5/2001 | Spies et al. | |
| 6,662,300 B1 | 12/2003 | Peters | |
| 6,754,507 B2 | 6/2004 | Takagi | |
| 6,845,380 B2 | 1/2005 | Su et al. | |
| 6,848,078 B1 | 1/2005 | Birsan et al. | |
| 6,925,313 B2 | 8/2005 | Kweon et al. | |
| 7,152,244 B2* | 12/2006 | Toomey | 726/26 |
| 7,392,543 B2* | 6/2008 | Szor | 726/23 |
| 7,475,135 B2* | 1/2009 | Bantz et al. | 709/224 |
| 2003/0023876 A1 | 1/2003 | Bardsley et al. | |
| 2003/0025668 A1 | 2/2003 | Lin | |
| 2003/0163737 A1 | 8/2003 | Roskind | |
| 2003/0199289 A1 | 10/2003 | Kao et al. | |
| 2003/0204481 A1 | 10/2003 | Lau | |
| 2004/0060007 A1 | 3/2004 | Gottlob et al. | |
| 2004/0128296 A1 | 7/2004 | Krishnamurthy et al. | |
| 2004/0143581 A1 | 7/2004 | Bohannon et al. | |
| 2004/0158714 A1 | 8/2004 | Peyravian | |
| 2004/0261018 A1 | 12/2004 | Dunne et al. | |
| 2005/0022020 A1 | 1/2005 | Fremberg | |

(Continued)

FOREIGN PATENT DOCUMENTS

JP    14-073553 A    3/2002

OTHER PUBLICATIONS

U.S. Appl. No. 11/172,466, filed Jun. 30, 2005, Florencio, et al.

(Continued)

*Primary Examiner* — Kambiz Zand
*Assistant Examiner* — Aubrey H Wyszynski
(74) *Attorney, Agent, or Firm* — Lee & Hayes, PLLC

(57) ABSTRACT

A phishing detection server component and method is provided. The component can be employed as part of a system to detect/phishing attacks. The phishing detection server component can receive password reuse event report(s), for example, from a protection component of client component(s).

Due to the malicious nature of phishing in general, the phishing detection server component can be susceptible to attacks by phishers (e.g., by reverse engineering of the client component). For example, false report(s) of PREs can be received from phisher(s) in an attempt to overwhelm the server component, induce false positives and/or induce false negatives. Upon receipt of a PRE report, the phishing detection server component can first verify that the timestamp(s) are genuine (e.g., previously generated by the phishing detection server component). The report verification component can employ the timestamp(s) to verify veracity of the report (e.g., to minimize attacks by phishers).

20 Claims, 14 Drawing Sheets

U.S. PATENT DOCUMENTS

| | | |
|---|---|---|
| 2005/0041009 A1 | 2/2005 | Kuroda |
| 2005/0049017 A1 | 3/2005 | Yoda |
| 2005/0068913 A1 | 3/2005 | Tan et al. |
| 2005/0087769 A1 | 4/2005 | Yamazaki et al. |
| 2005/0108567 A1 | 5/2005 | D'Souza et al. |
| 2005/0127820 A1 | 6/2005 | Yamazaki et al. |
| 2005/0177578 A1 | 8/2005 | Chen |
| 2005/0179850 A1 | 8/2005 | Du |
| 2005/0182778 A1 | 8/2005 | Heuer et al. |
| 2005/0192990 A1 | 9/2005 | Kharitidi et al. |
| 2005/0229097 A1 | 10/2005 | Lander |
| 2005/0235358 A1 | 10/2005 | Keohane et al. |
| 2006/0015358 A1* | 1/2006 | Chua ................................ 705/1 |
| 2006/0055608 A1 | 3/2006 | Minemura |
| 2006/0200856 A1* | 9/2006 | Salowey et al. .................... 726/5 |
| 2006/0216469 A1 | 9/2006 | Hashizume |
| 2006/0232495 A1 | 10/2006 | Chang et al. |
| 2006/0250312 A1 | 11/2006 | Kobayashi |
| 2007/0005984 A1 | 1/2007 | Florencio et al. |
| 2007/0006305 A1 | 1/2007 | Florencio et al. |
| 2007/0199054 A1 | 8/2007 | Florencio et al. |
| 2008/0015002 A1 | 1/2008 | Crisp |

OTHER PUBLICATIONS

U.S. Appl. No. 11/360,254, filed Feb. 23, 2006, Florencio, et al.

Adida, B. et al., "Fighting Phishing Attacks: A Lightweight Trust Architecture for Detecting Spoofed Emails," in Proceedings of DIMACS Workshop on Theft in E-Commerce: Content, Identity, and Service, Piscataway, New Jersey, Apr. 2005. 16 pages.

Adida, B. et al., "Separable Identity-based Ring Signatures: Theoretical Foundations for Fighting Phishing Attacks," in Proceedings of DIMACS Workshop on Theft in E-Commerce: Content, Identity, and Service, Piscataway, New Jersey, Feb. 28, 2005, 18 pages.

Chou, N. et al., "Client-Side Defense Against Web-Based Identity Theft," in Proceedings of 11th Annual Network and Distributed System Security Symposium (NDSS '04), San Diego, Feb. 2004, 16 pages.

Delany, M., "Domain-Based Email Authentication Using Public-Keys Advertised in the DNS (DomainKeys)," Internet Draft available at: http://www.ietf.org/internet-drafts/draft-delany-domainkeys-base-03.txt, Sep. 29, 2005, last checked Feb. 24, 2006, 40 pages.

Florencio, D. and Herley, C., "Stopping a Phishing Attack, Even When the Victims Ignore Warnings," Microsoft Research Technical Report, Oct. 2005. Available at: http://research.microsoft.com/research/pubs/view.aspx?type=Publication&id=1489, last accessed Feb. 24, 2006.

Gabber, E. et al., "How to Make Personalized Web Browsing Simple, Secure, and Anonymous," Financial Cryptography, 1997, pp. 17-32.

Halderman, J.A. et al., "A Convenient Method for Securely Managing Passwords," in Proceedings of the 14th International World Wide Web Conference (WWW 2005), Chiba, Japan, May 10-14, 2005, 9 pages.

Jakobsson, M. and Young, A., "Distributed Phishing Attacks," in Proceedings of DIMACS Workshop on Theft in E-Commerce: Content, Identity, and Service, Piscataway, New Jersey, Apr. 2005, 10 pages.

Kelsey, J. et al., "Secure Applications of Low-Entropy Keys," Lecture Notes in Computer Science, 1997, vol. 1396, pp. 121-134.

Oechslin, P., "Making a Faster Cryptanalytical Time-Memory Trade-Off," in Proceedings of Advances in Cryptology—CRYPTO 2003, 23rd Annual International Cryptology Conference, Santa Barbara, California, Aug. 17-21, 2003, 15 pages.

Ross, B. et al., "A Browser Plug-In Solution to the Unique Password Problem," in Proceedings of the 14th USENIX Security Symposium, Technical Report Stanford-SecLab-TR-2005-1, 2005, 15 pages.

Sahami, M. et al., "A Bayesian Approach to Filtering Junk Email," in AAAI '98 Workshop on Learning for Text Categorization, Jul. 1998, 8 pages.

http://www.passport.com, links directly to: https://accountservices.passport.net/ppnetworkhome.srf?vv=330&lc=1033, last accessed Feb. 28, 2006.

http://www.spoofstick.com, last accessed Feb. 28, 2006.

Anti-Phishing Working Group, at http://www.antiphishing.org, last accessed Feb. 28, 2006.

"Bloom Filter" http://www.nist.gov/dads/HTML/bloomFilter.html last viewed, Jan. 27, 2006, 1 page.

"Earthlink Toolbar Featuring ScamBlocker for Windows Users" http://www/earthlink.net/software/free/toolbar/, last accessed Mar. 7, 2006, 2 pages.

Ross, et al. "Stronger Password Authentication Using Browser Extensions" (2005) Proceedings of the 14th Usenix Security Symposium 15 pages.

OA Dated Dec. 26, 2008 for U.S. Appl. No. 11/172,466, 35 pages.

OA Dated Dec. 23, 2008 for U.S. Appl. No. 11/318,378, 25 pages.

OA Dated Dec. 3, 2008 for U.S. Appl. No. 11/317,767, 13 pages.

OA Dated Dec. 29, 2008 for U.S. Appl. No. 11/319,377, 19 pages.

OA Dated Oct. 15, 2008 for U.S. Appl. No. 11/318,209, 14 pages.

Netcraft, "Netcraft Toolbar Help Pages FAQ," 2004, available at: http://toolbar.netcraft.com/help/faq/index.html.

Boneh, et al., "Defending Against Online Identity Theft and Phishing," presentation given at Proceedings: United States—Japan Critical Information Infrastructure Protection Workshop, Sep. 2004, available at: http://www2.gwu.edu/~usjpciip/BonehD.pdf.

Boneh, et al., "Web Password Hashing," 3 pages, last accessed Jun. 28, 2005, available at: http://crypto.stanford.edu/PwdHash.

International Search Report dated Oct. 24, 2007 for PCT Application Serial No. PCT/US2007/004044, 3 Pages.

"James F. Power, et al., A metrics suite for grammar-based software, Journal of Software Maintenance and Evolution: Research and Practice, 2004http://www.cs.nuim.ie/~jpower/Research/Papers/2004/jsme04.pdf".

* cited by examiner

ATTACK RESISTANT PHISHING DETECTION

CROSS REFERENCE TO RELATED APPLICATION(S)

This application is related to co-pending U.S. patent application Ser. No. 11/172,466, filed Jun. 30, 2005, and entitled, "PREVENTING PHISHING ATTACKS".

BACKGROUND

As the Internet grows in popularity as a business medium, users engage in a wider variety of transactions online. Some of these transactions, such as transactions with financial institutions or online retailers, can involve sensitive personal information such as bank account numbers or credit card information. To protect such information, a variety of methods can be employed. For example, many online institutions require users to register with the institution and obtain a unique user name and password prior to transacting any business online.

One consequence of this system is that a username and password can only help protect the personal information of a user so long as the username and password remain under the control of the user. A third party who obtains the username and password of another can use that username and password to perform any transaction that the owner could perform. This consequence has spawned a practice commonly referred to as phishing.

Phishing can generally be described as an attempt by a third party to deceive a user into disclosing his username and password to that third party through the third party's impersonation of an entity that is known and trusted by the user. Generally, a phishing attack can be initiated by sending an electronic mail message to a user that is crafted to appear to originate from a known and trusted entity. Such electronic mail messages commonly inform the recipient that the entity must verify the information of the user by having the user enter his username and password. The user may enter this information at a web site that appears to belong to the known and trusted entity but is actually controlled by a third party. Once the user enters this information at the web site of the third party, sometimes called a phishing site, the third party can use the entered username and password at the real website of the entity that the third party is impersonating to perform transactions or even to wrest control of an account with the known and trusted party away from the user.

Several factors make phishing a challenging problem from a computer security standpoint. First, in phishing attacks the victim unknowingly or unwittingly assists the attacker by voluntarily providing his security credentials such as a username and password to the attacker. Second, identifying phishing sites can be difficult using a fixed algorithm because attackers both quickly adapt to security measures and it is difficult if not impossible to anticipate the ingenuity of all future attackers with a fixed set of rules. Third, users tend to ignore warnings about security dangers. Even the best warnings can be rendered useless by a user who does not heed the warning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A phishing detection server component and method is provided. The component can be employed as part of a system to detect and, optionally, prevent phishing attacks. The phishing detection server component can receive password reuse event report(s), for example, from protection component(s) of client component(s).

The protection component can identify password reuse event(s) (PREs) in which a protected credential (e.g., password) is attempted to be used at a different site. The PRE is reported to the phishing detection server component which can aggregate information from one or more client components to determine whether a phishing attack is in progress. A site can be routed to a grader if greater than a threshold number of PRE reports appear against a phishable (e.g., non-trustworthy) site. The grader can identify suspected phishing site(s) to the client component (e.g., by providing a warning when phishing is suspected). If it is determined that a phishing attack is in progress, the phishing detection server component can provide information back to the client component, for example, warning the issue of the phishing attack and/or prevent entry of the credential by the user.

Due to the malicious nature of phishing in general, the phishing detection server component can be susceptible to attacks by phishers (e.g., by reverse engineering of the client component). For example, false report(s) of PREs can be received from phisher(s) in an attempt to overwhelm the server component, induce false positives and/or induce false negatives.

The phishing detection server component can include a report verification component that receives PRE report(s) from client component(s). Information regarding the reports can be stored in a report store which the phishing detection server component can use in performing phishing analysis.

For each PRE, the phishing detection server component can return to the client component a timestamp generated by a timestamp generator that verifies that the client component made this report to the server component at that time. Timestamps generated by the timestamp generator are unique, in the sense that no two client components ever get an identical stamp (e.g., cryptographic token). This allows the server component to recognize a returning client, even without binding the identity of the client to name address or other personally identifiable information (PII) data.

From the perspective of the client component, in response to a PRE report, the phishing detection server component provides the client component a timestamp for each entry that has been added to the protected credential store (e.g., protected list) since the last report. In addition, the client component provides the server component the timestamp for the site(s) generating the report.

Upon receipt of a PRE report, the report verification component can first verify that the timestamp(s) are genuine (e.g., previously generated by the phishing detection server component). The report verification component can employ the timestamp(s) to determine veracity of the report (e.g., to minimize attacks by phishers). For example, the report verification component can store, but not use, report(s) where none of the timestamps is at least a threshold period of time old (e.g., 3 months old). Thus, in the event that a phisher has reverse engineered the client component, the threshold period of time would have to pass before the phisher could have any significant impact on the efficacy of the system.

In another example, the report verification component stores, but does not use or gives reduced weight to report(s) where any of the timestamps has been used in a report in a second threshold period of time (e.g., last 10 days). As such, attempt(s) by the phisher to overwhelm the phishing detection server component with report(s) having the same timestamp within the second threshold period of time would not significantly affect the system.

In a third example, report(s) in which any of the timestamps has appeared more than a third threshold quantity of times (e.g., 100) are stored by the report verification component but not used (or given little weight). Again, attempt(s) by the phisher to overwhelm the phishing detection server component with report(s) would be thwarted once the third threshold quantity of times has been exhausted. Additional reports by the phisher would have little or no effect on the system.

In yet a fourth example, the report verification component stores, but does not use report(s) where any of the timestamps were used to report that a site subsequently identified as phishing has a re-use event against a non-targeted site. Thus, any clients used by phishers to delay the identification of a phishing site cannot be used again to delay identification of any other phishing sites By identifying potentially erroneous reports, the phishing detection server component can mitigate the impact on the system.

Optionally, the phishing detection server component can check for erroneous and/or false password reuse event report(s) by verifying with at least one trusted site, that claimed login event(s) actually occurred. If the trusted site confirms the login(s), the report can be employed by the system. However, if the trusted site does not confirm the login(s), the report can be stored but not used (or given little weight) by the phishing detection server component.

Further, in another example, the phishing detection server component can determine the likelihood of a password reuse event report being true based on learned statistics of password reuse. For example many financial institutions have particular restrictions on passwords that make sharing among pairs of sites virtually impossible. Based on the statistics that the report verification component acquires it can infer these rules (e.g., rather than manually determine them), and discount reports that are determined to be fraudulent.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
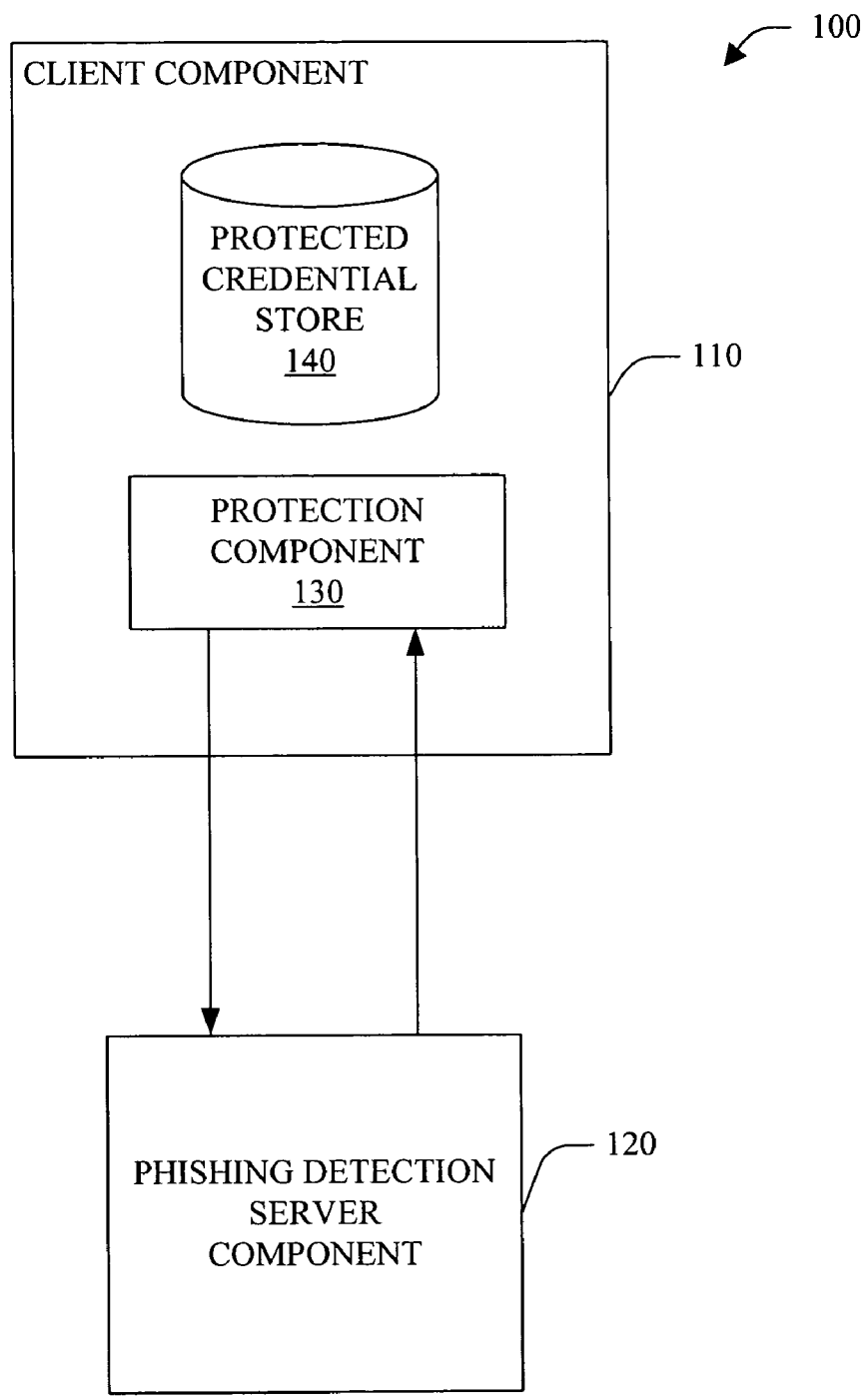
FIG. 1 is a block diagram of a phishing detection system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Detection/Prevention of Phishing Attacks

Referring to FIG. 1, a phishing detection system 100 is illustrated. The system 100 can be employed to detect and, optionally, prevent phishing attacks. Thus, the system 100 can be used to prevent unauthorized acquisition of security credentials, such as username and password combinations, by unauthorized third parties. Additionally or alternatively, the phishing prevention system 100 can be used to warn a user that he is the target of a phishing attack and reinforce good computing security practices.

The system 100 can include a client component 110 and a phishing detection server component 120. For example, the client component 110 can be implemented as an add-on component, such as a plugin, for a web browser. The client component 110 can also be implemented to work with an electronic mail reader or client, especially an electronic mail reader or client that supports the use of hypertext markup language (HTML) in messages.

Due at least in part to the nature of phishing attacks, the client component 110 can be of great value in determining whether a user is a target of a phishing attack. For example, in one implementation, the client component 110 can be part of a web browser. The use of a web browser can facilitate a phishing attack because it provides a platform upon which an attacker can reproduce the format, layout and content, including graphical content, of a trusted website. However, other capabilities of the web browser can be used to defeat an attempted attack. For example, the web browser can provide additional information about a source of the information displayed, such as a uniform resource locator (URL), an Internet protocol (IP) address, and a relatively standard format for obtaining and presenting user input. Such information can be used to verify content sources and protect personal information, specifically including security credentials.

The client component 110 includes a protection component 130 and a protected credential store 140. The protection component 130 identifies and stores credential(s) in the protected credential store 140.

The protected credential store 140 can be any suitable or appropriate data store, such as a text file, a database, a linked list, or a data structure. Generally it will be desirable to encrypt or hash the protected credentials to protect them from attack. In one example, the protected credential store 140 is a text file that includes a pre-selected maximum number of entries, for example, two hundred fifty six (256). This preselected maximum value is arbitrary and is merely selected to control storage space. Another value, or no value at all, can also be chosen.

In this example, entries in the protected credential store 140 can be stored in the following format:

$$P_0 = \{dom, H_1, H_2\}$$

where dom is the domain name of the computing system from which an HTML form or other request for security credentials originated, $H_1$ is a hash of the password, and $H_2$ is a hash of the username. To control entries in the list, an appropriate entry replacement algorithm can be employed. One such algorithm is the least recently used (LRU) algorithm. A new entry replaces an entry deem to be the one that has least recently been used.

The protection component 130 can further identify password reuse event(s) (PREs) in which a protected credential (e.g., password) is attempted to be used at a different site. The PRE is reported to the phishing detection server component 120 which can aggregate information from one or more client components 110 to determine whether a phishing attack is in progress. If it is determined that a phishing attack is in progress, the phishing detection server component 120 can provide information back to the client component 110, for example, warning the user of the phishing attack and/or prevent entry of the credential by the user.

PRE Report Verification

Due to the malicious nature of phishing in general, the phishing detection server component 120 can be susceptible to attacks by phishers (e.g., by reverse engineering of the client component 110). For example, false report(s) of PREs can be received from phisher(s) in an attempt to overwhelm the server component 120, induce false positives and/or induce false negatives.

Figure 2:
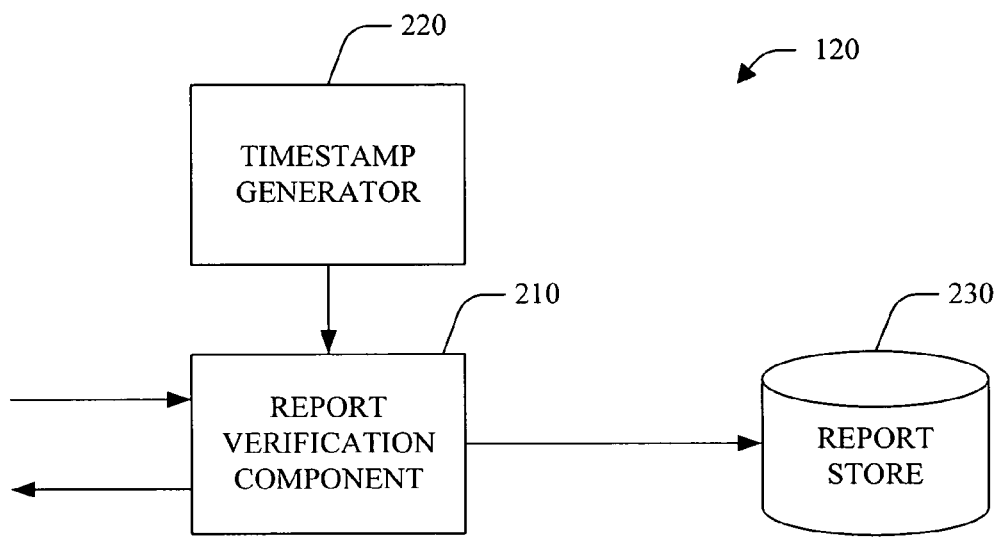
FIG. 2 is a block diagram of a phishing detection server component.

Referring to FIG. 2, an exemplary phishing detection server component 120 is illustrated. The server component 120 can include a report verification component 210 that receives PRE report(s) from client component(s) 110. Information regarding the reports can be stored in a report store 230 which the phishing detection server component 120 can use in performing phishing analysis.

For each entry in the protected credential store 140, the phishing detection server component 120 returns to the client component 110 a timestamp generated by a timestamp generator 220 that verifies that the client component 110 contacted the server at that particular time about that particular protected entry. Timestamps generated by the timestamp generator 220 are unique, in the sense that no two client components 110 ever get an identical stamp (e.g., cryptographic token). This allows the server component 120 to recognize a returning client, even without binding the identity of the client to name address or other personally identifiable information (PII) data.

From the perspective of the client component 110, the phishing detection server component 120 provides the client component 110 a timestamp for each entry that has been added to the protected credential store 140 (e.g., protected list). This could be done as soon as a new entry in added, or the client could group several entries together before requesting the timestamps. In another example, the client waits until a PRE is generated before contacting the server, and, at that point, requests time stamps for all entries that were added since the last report. In addition, the client component 110 provides the phishing detection server component 120 the timestamp for the site(s) generating the report. For example, if a client component 110 is reporting re-use between the sites (Trusted Site$_1$, Trusted Site$_2$, Trusted Site$_3$) and PhishPal, the report includes a timestamp verifying the time that each of Trusted Site$_1$, Trusted Site$_2$ and Trusted Site$_3$ were added to that client's protected credential store 140 (e.g., protected list). Timestamp(s) can further be obtained from the phishing detection server component 120 for any site(s) newly added to the list.

Figure 3:
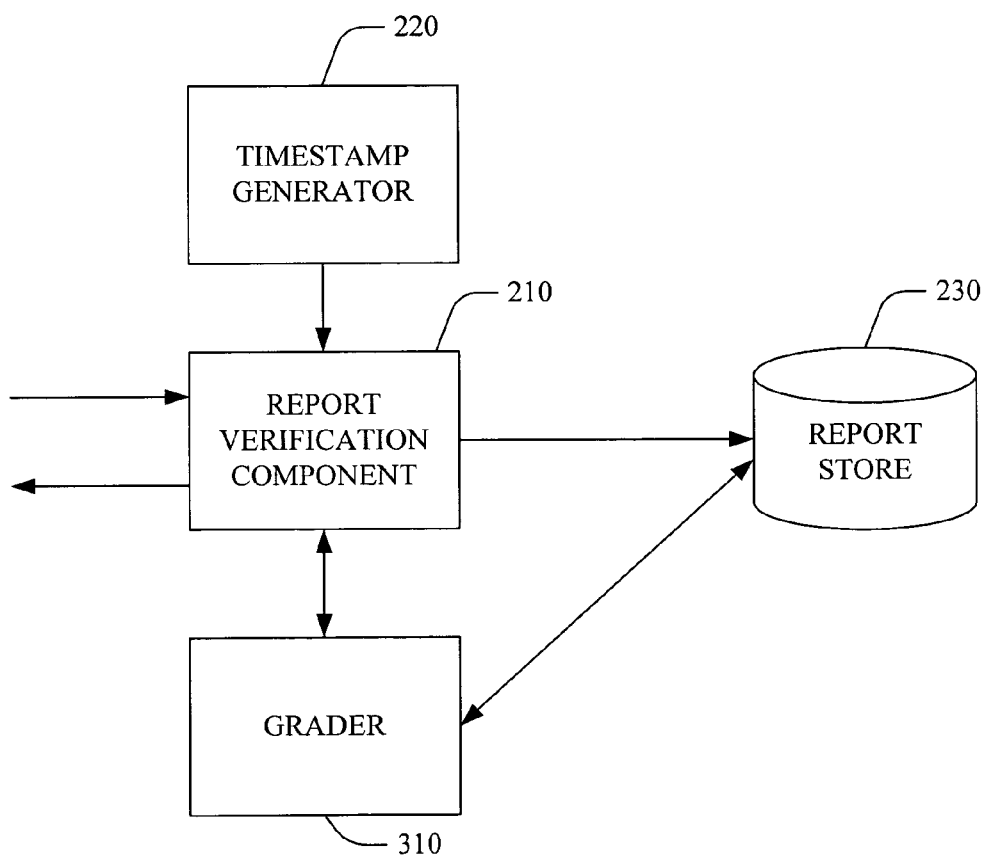
FIG. 3 is a block diagram of phishing detection server component.
Figure 4:
FIG. 4 is a block diagram of a phishing detection system.

Upon receipt of a PRE report, the report verification component 210 can first verify that the timestamp(s) are genuine (e.g., previously generated by the phishing detection server component 120). As illustrated in FIG. 3, a site is routed to a grader 310 if greater than a threshold number of PRE reports appear against a phishable (e.g., non-trustworthy) site. The grader 310 can identify suspected phishing site(s) to the client component 110 (e.g., by providing a warning when phishing is suspected).

Timestamp Used to Verify Report

From the phishing detection server component 120's perspective, as noted previously, the report verification component 210 can be susceptible to attacks by phishers, for example, flooding of the phishing detection server component 120 with erroneous reports. In order to mitigate the effects of such attacks, in one example, the report verification component 210 stores, but does not use or gives reduced weight to report(s) where none of the timestamps is at least a threshold period of time old (e.g., 3 months old). Thus, in the event that a phisher has reverse engineered the client component 110, the threshold period of time would have to pass before the phisher could have any significant impact on the efficacy of the system 100.

In another example, the report verification component 210 stores, but does not use or gives reduced weight to report(s) where any of the timestamps has been used in a report in a second threshold period of time (e.g., last 10 days). As such, attempt(s) by the phisher to overwhelm the phishing detection server component 120 with report(s) having the same timestamp within the second threshold period of time would not significantly affect the system 100.

In a third example, report(s) in which any of the timestamps has appeared more than a third threshold quantity of times (e.g., 100) are stored by the report verification component 210 but not used (or given little weight). Again, attempt(s) by the phisher to overwhelm the phishing detection server component 120 with report(s) would be thwarted once the third threshold quantity of times has been exhausted. Additional reports by the phisher would have little or no effect on the system 100.

In yet a fourth example, the report verification component 210 stores, but does not use report(s) where any of the timestamps were used to report that a site subsequently identified as phishing has a re-use event against a non-targeted site. Thus, any clients used by phishers to delay the identification of a phishing site cannot be used again to delay identification of any other phishing sites. By identifying potentially erroneous reports, the phishing detection server component 120 can mitigate the impact on the system 100.

Trusted Site Server Used to Verify Report

Additionally and/or alternatively, the report verification component 210 can check for erroneous PREs by verifying with at least one institution, whether the claimed login events actually occurred. For example a PRE that claims that a client used their Trusted Site password at PhishPal can include the time of the last N Trusted Site login(s), and the hash of the userid of the Trusted Site$_1$, account. The phishing detection server component 120 checks with the Trusted Site server that these logins actually occurred. If the Trusted Site server confirms the login(s), the report can be employed by the system 100. However, if the Trusted Site server does not confirm the login(s), the report can be stored but not used (or given little weight) by the phishing detection server component 120.

Learned Statistics of Password Reuse

In another example, the report verification component 210 determines the likelihood of a PRE being true based on the learned statistics of password reuse. For example many financial institutions have particular restrictions on passwords that make sharing among pairs of sites virtually impossible. For example, if one site allows only a four digit PIN, while another requires a 6-10 digit alphanumeric, a PRE listing those two sites would be impossible from a legitimate client. Based on the statistics that the phishing detection server component 120 acquires it can infer these rules rather than manually determine them, and discount reports that are determined to be fraudulent. Additionally, the phishing detection server component 120 can further invalidate further reports from client(s) that make those reports (e.g., by examine their unique timestamps).

Other likelihoods can be inferred based on patterns such as geographic coverage. For example, a PRE listing a PTA in New Jersey and a small local bank in Oklahoma has smaller likelihood of being true than if the bank were in New Jersey.

Feedback

Figure 5:
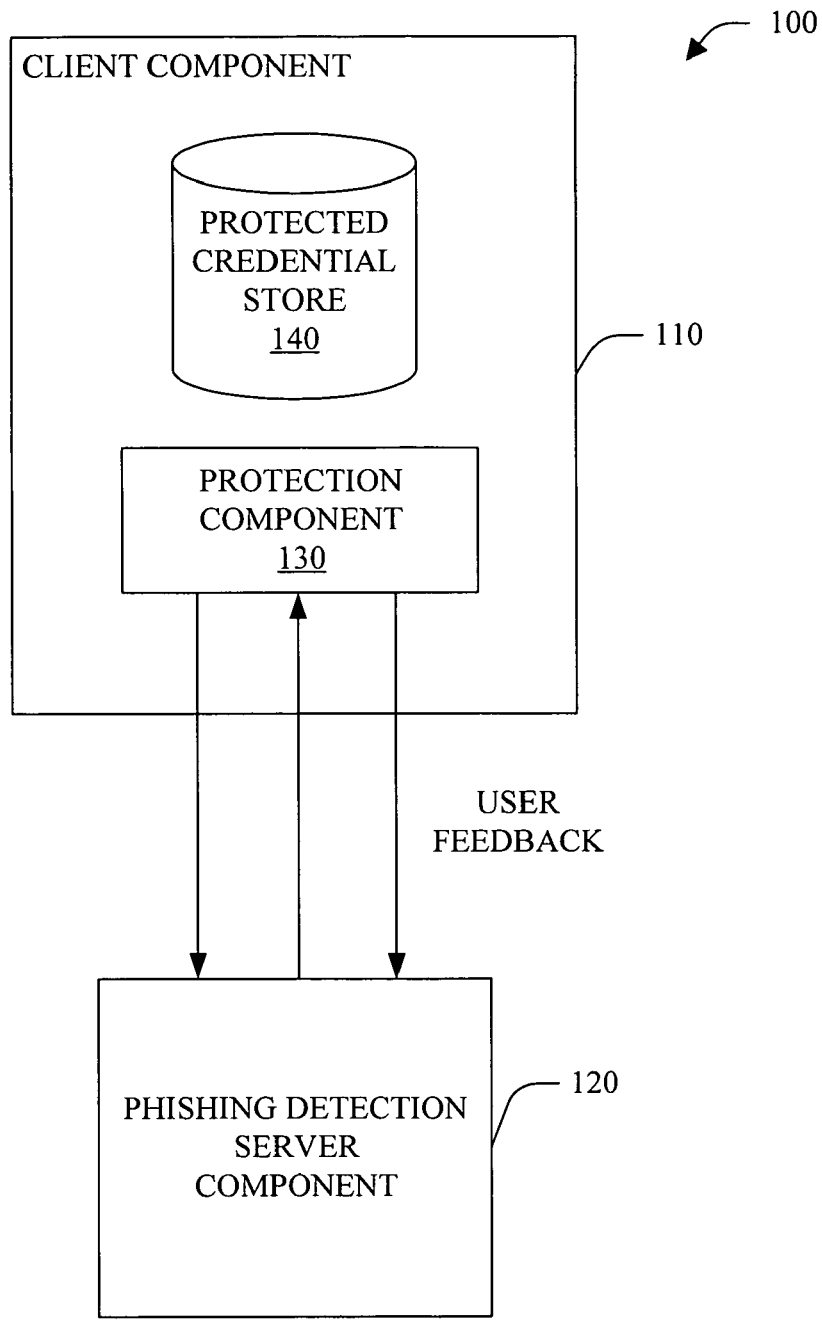
FIG. 5 is a block diagram of a phishing detection system.

Turning to FIG. 5, the system 100 can further include a warning from the phishing detection server component 120 to the client component 110 when phishing is suspected. Based on the user's response to the warning (e.g., user chose to heed or ignore warning), the client component 110 can provide feedback to the phishing detection server component 120. The phishing detection server component 120, and more particularly, the grader 310, can employ the feedback in assessing whether the warning was valid, for example, increased likelihood of phishing if the warning was heeded (e.g., reinforcement), decreased likelihood of phishing if the warning was ignored.

Traffic Information

In one example, the report verification component 210 can receive traffic information with respect to sites. In this example, the report verification component 210 can determine whether the frequency of PREs for a site are commensurate with the traffic patterns. For example, for a legitimate site, a user logs in and then performs actions at the site. To the contrary, for a phishing site, the user would login—thus exposing the user's credentials; however, the user would generally not perform any further substantive actions at the site. Equally, on legitimate sites there may be useful portions of the site that are accessible and not password protected. Thus for a legitimate site there will generally be a great deal of traffic for every PRE generated; that is the users who generate PRE's will represent a small fraction of the overall traffic on the site. For a phishing site, by contrast the PRE's will represent almost all of the traffic from legitimate users.

Web Page Examination

In another example, the report verification component 210 can analyze PREs from a plurality of client component 110 to ascertain the suspected phishing site as well as the target. For example, a first report can be received which identifies that a user's credentials for Trusted Site$_1$, has been reused at Trusted Site$_2$, Trusted Site$_3$ and PhishPal. A second report can be received which identifies that another user's credentials for Trusted Site, has been reused at Trusted Site$_4$ and PhishPal and so on. Based on these reports, the report verification component 210 can determine a suspected phishing site as well as the target.

Once the report verification component 210 detects possible phishing, the report verification component 210 can test that hypothesis by examining the suspected page (e.g., PhishPal) and the target page (e.g., Trusted Site$_1$). For example, if PhishPal is suspected of attacking Trusted Site$_1$, the report verification component 210 can examine the two pages to determine whether this is plausible. For example, if the target does not contain a password field, the suspicion is clearly false, and arises from fraudulent reports. Several other automatic checks can be done to compare the two pages. Additionally, if a human must examine the pages before determining to whether or not to block the suspected page, the human can have both pages loaded side by side before starting analysis.

Target Institution Notification

Figure 6:
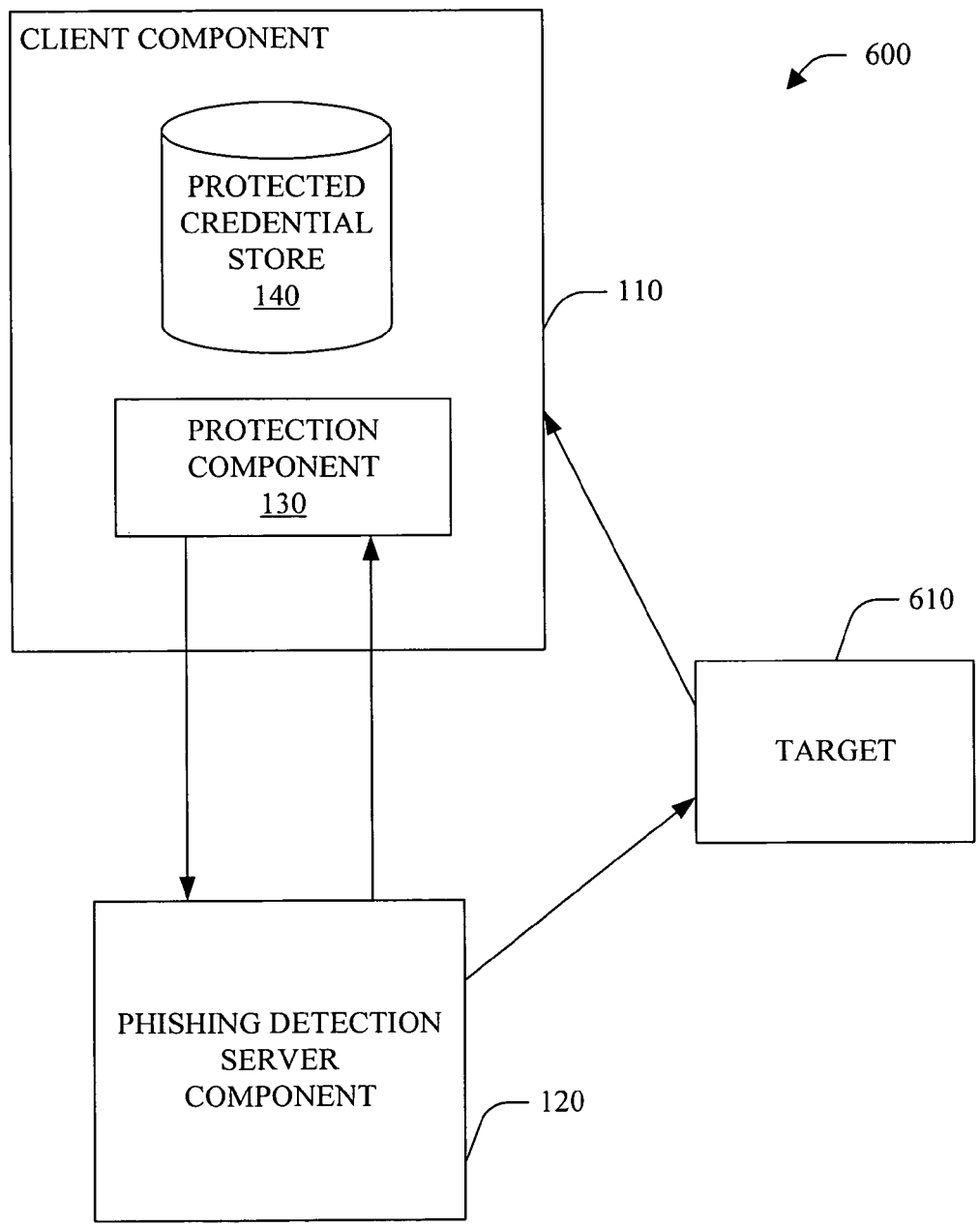
FIG. 6 is a block diagram of a phishing notification system.

Referring to FIG. 6, a phishing notification system 600 is illustrated. In this example, rather than block an account after the phishing detection server component 120 has determined that a site is phishing and a particular user has been phished, a target 610 can change the password on that account and notify the user of the new password (e.g., e-mail the new password to the e-mail address on record for the user). In this manner, the user will not be locked out, while the phisher will be unable to access the account. The phisher would need access to the user's e-mail as well as inducing them to type their password in order to circumvent this situation.

It is to be appreciated that the system 100, the client component 110, the phishing detection server component 120, the protection component 130, the protected credential store 140, the report verification component 210, the timestamp generator 220, the report store 230, the grader 310, trusted site 410, the system 600 and/or the target 610 can be computer components as that term is defined herein.

Turning briefly to FIGS. 7-12, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 7:
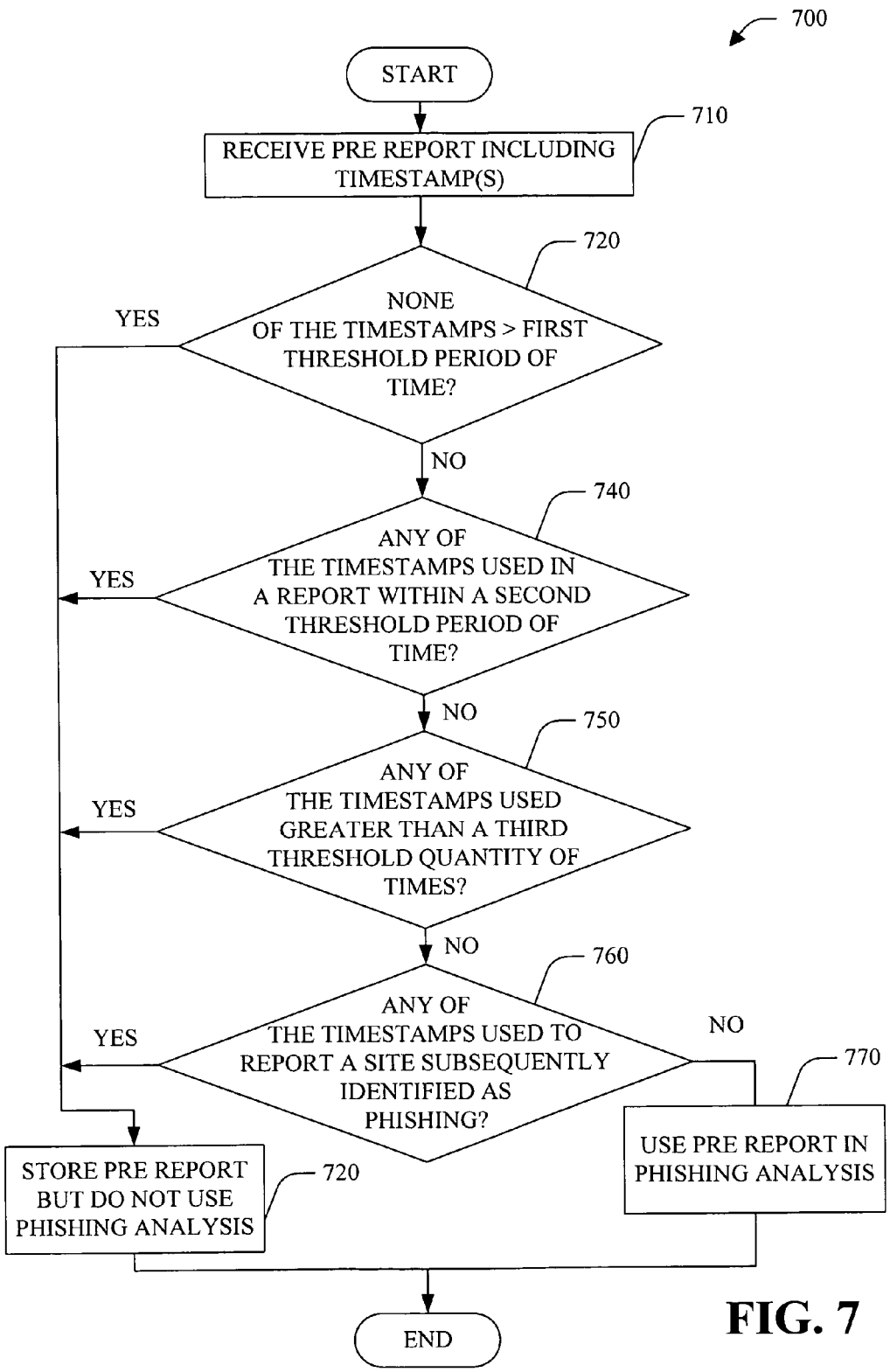
FIG. 7 is a flow chart of a method of verifying a password reuse event report.

Referring to FIG. 7, a method of verifying a password reuse event report 700 is illustrated. At 710, a password reuse event report including timestamp(s) is received (e.g., from a client component 110). At 720, a determination is made as to whether none of the timestamps is greater than a first threshold period of time (e.g., 30 days).

If the determination at 720 is YES, processing continues at 730. If the determination at 720 is NO, at 740, a determination is made as to whether any of the timestamps has been used in a report within a second threshold period of time.

If the determination at 740 is YES, processing continues at 730. If the determination at 740 is NO, at 750, a determination is made as to whether any of the timestamps has been used greater than a third threshold quantity of times.

If the determination at 750 is YES, processing continues at 730. If the determination at 750 is NO, at 760, a determination is made as to whether any of the timestamps is associated with a site subsequently identified as a phishing site. If the determination at 760 is NO, processing continues at 730.

If the determination at 760 is YES, at 770, the password reuse event report is employed in the phishing analysis and no further processing occurs. At 730, the password reuse event report is stored but is not used in the phishing analysis (e.g., suspected false report), and, no further processing occurs.

Figure 8:
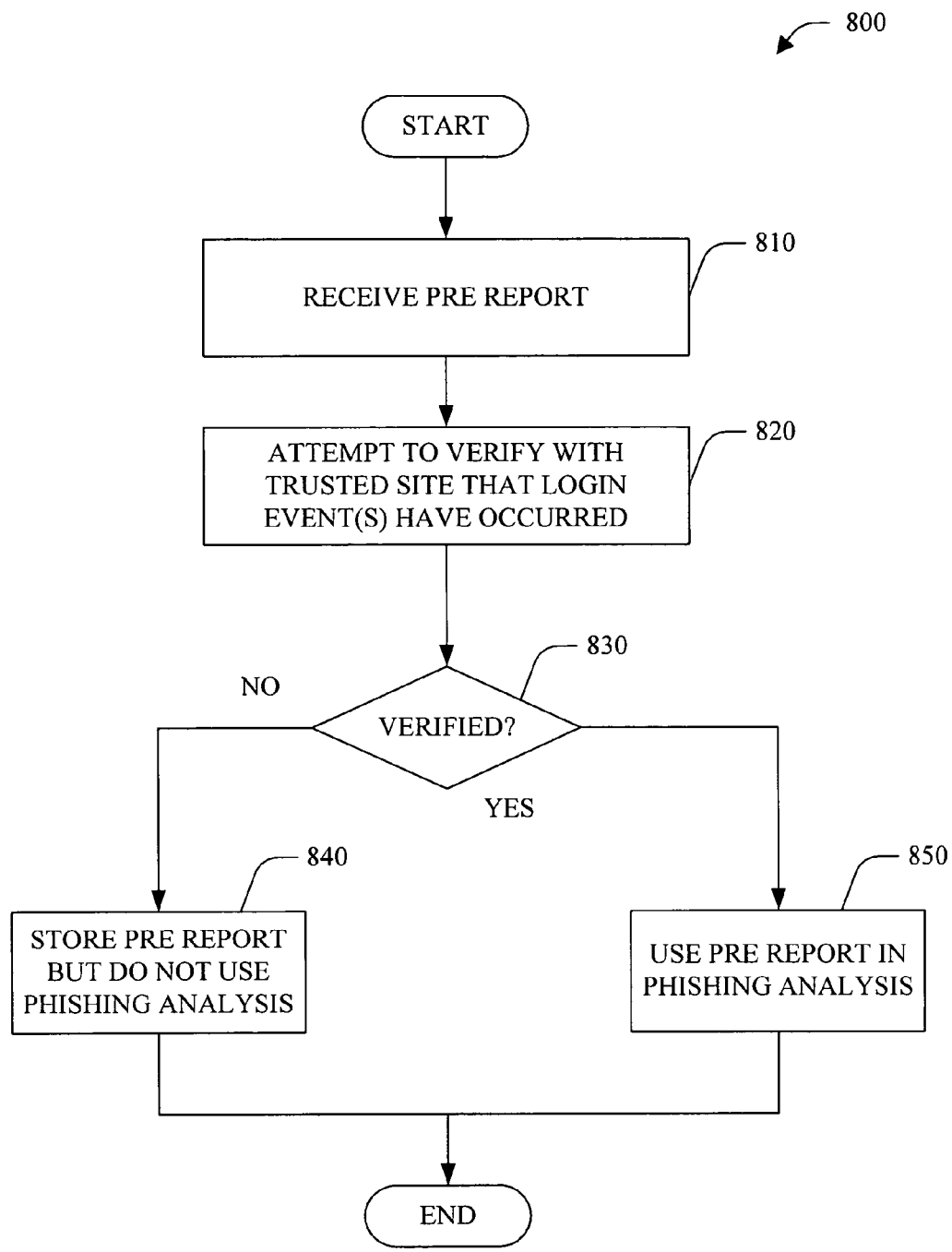
FIG. 8 is a flow chart of a method of verifying a password reuse event report.

Turning to FIG. 8, a method of verifying a password reuse event report 800 is illustrated. At 810, a password reuse event report is received. At 820, an attempt is made to verify with trusted site that login event(s) have occurred. At 830, a determination is made as to whether the login has been verified. If the determination at 830 is NO, at 840 the password reuse event report is stored, but is not used to perform phishing analysis, and, no further processing occurs. If the determination at 830 is YES, the password reuse event is employed in the phishing analysis, and, no further processing occurs.

Figure 9:
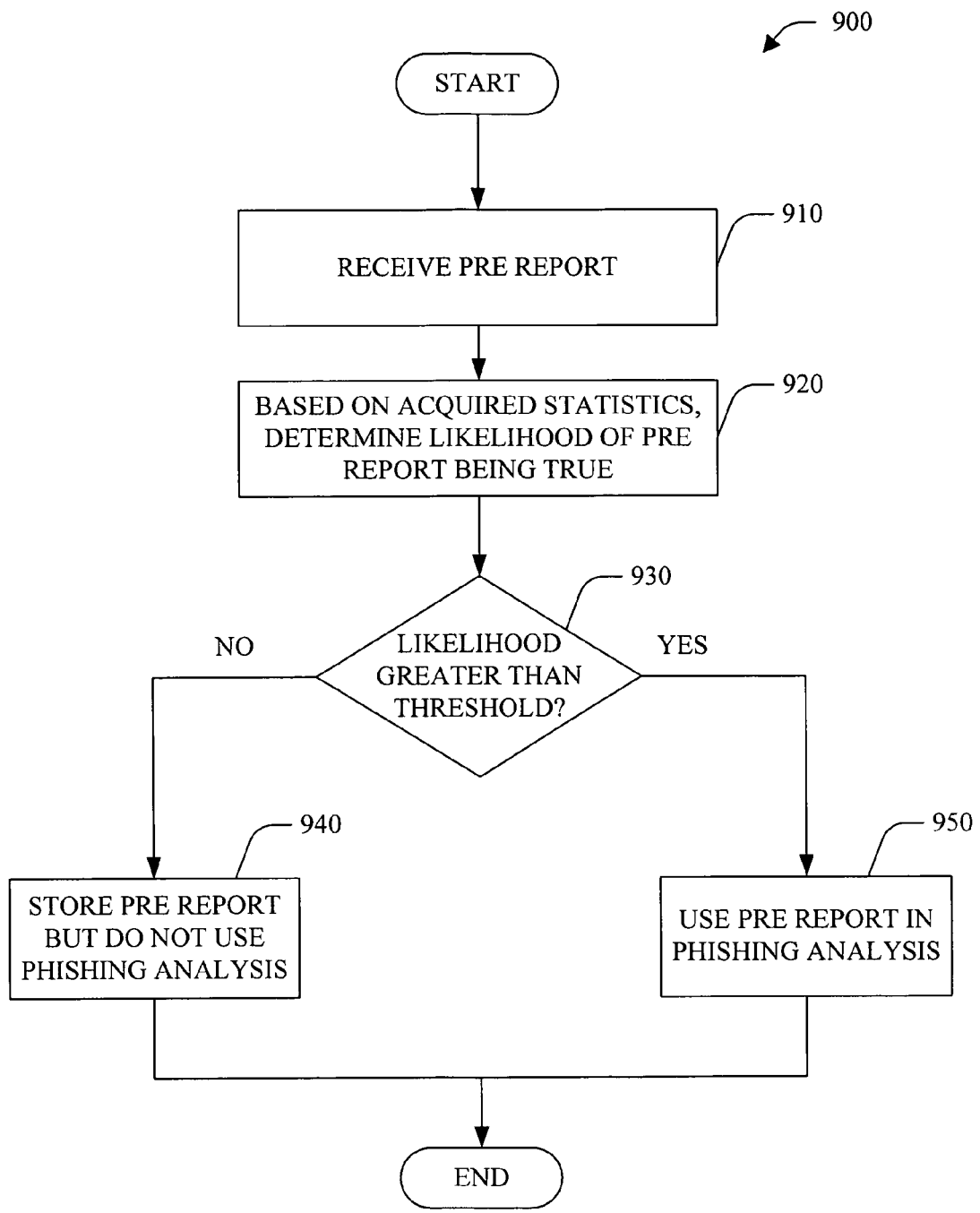
FIG. 9 is a flow chart of a method of verifying a password reuse event report.

Next, referring to FIG. 9, a method of verifying a password reuse event report 900 is illustrated. At 910, each reuse event is received. At 920, based on acquired statistics, a determination is made as to the likelihood of the password reuse event report being true. At 930, a determination is made as to whether the likelihood is greater than a threshold period. If the determination at 930 is NO, the password reuse event report is stored, but is not used to perform phishing analysis, and, no further processing occurs at this point. If the determination 930 is YES, the password reuse event report is employed in the phishing analysis, and, for the processing occurs.

Figure 10:
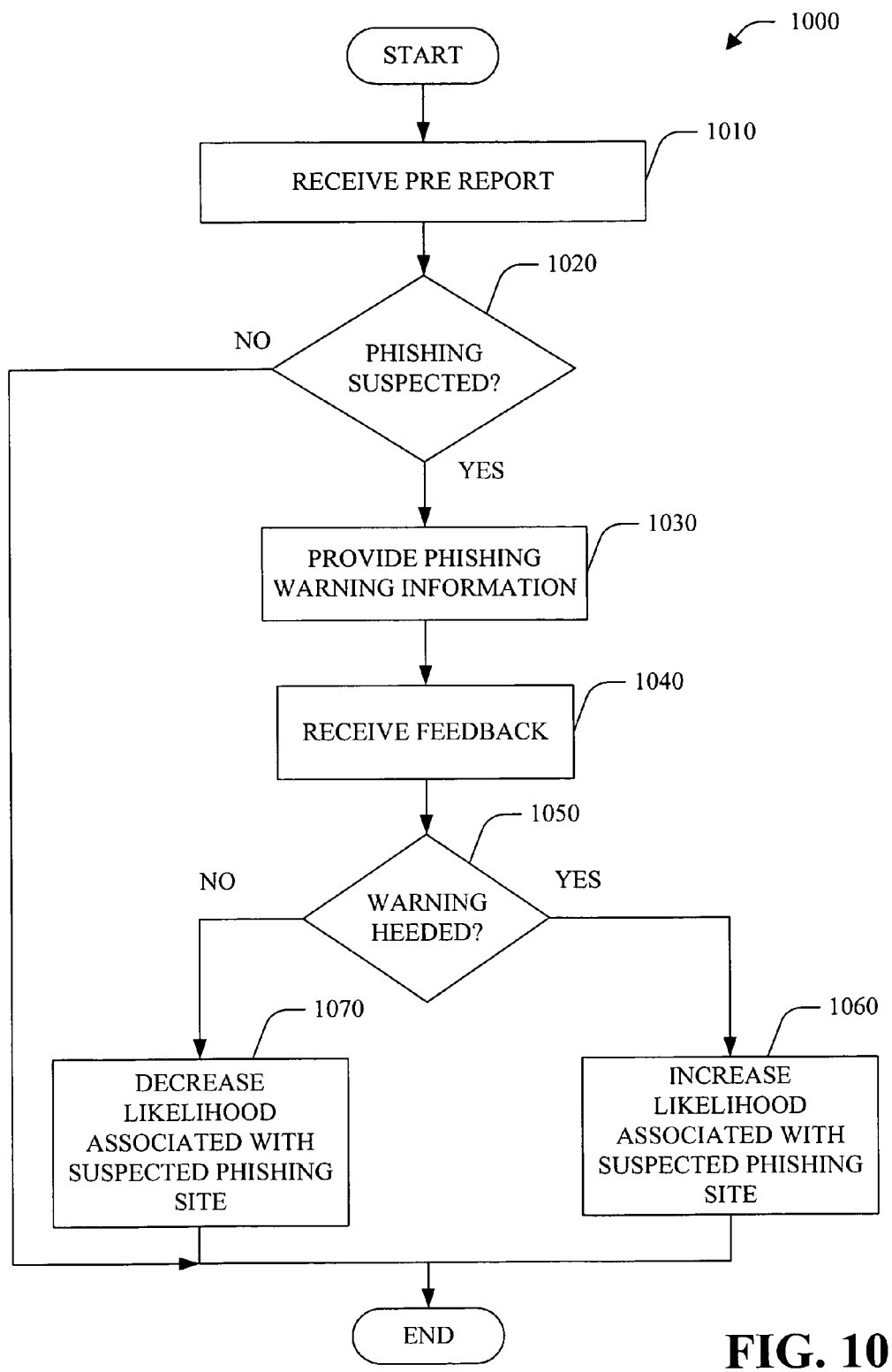
FIG. 10 is a flow chart of a method of detecting phishing.

Turning next to FIG. 10, a method of detecting phishing 1000 is illustrated. At 1010, a password reuse event report is received. At 1020, a determination is made as to whether phishing is suspected. If the determination at 1020 is NO, no further processing occurs.

If the determination 1020 is YES, at 1030, phishing warning information is provided. At 1040, feedback is received (e.g., from a user). At 1050, a determination is made as to whether the warning was heeded.

If the determination at 1050 is YES, at 1060, the likelihood associated with the suspected phishing site is increased, and, no further processing occurs. If the determination 1050 is NO, at 1070, the likelihood associated with the suspected phishing site is decreased, and to no further processing occurs.

Figure 11:
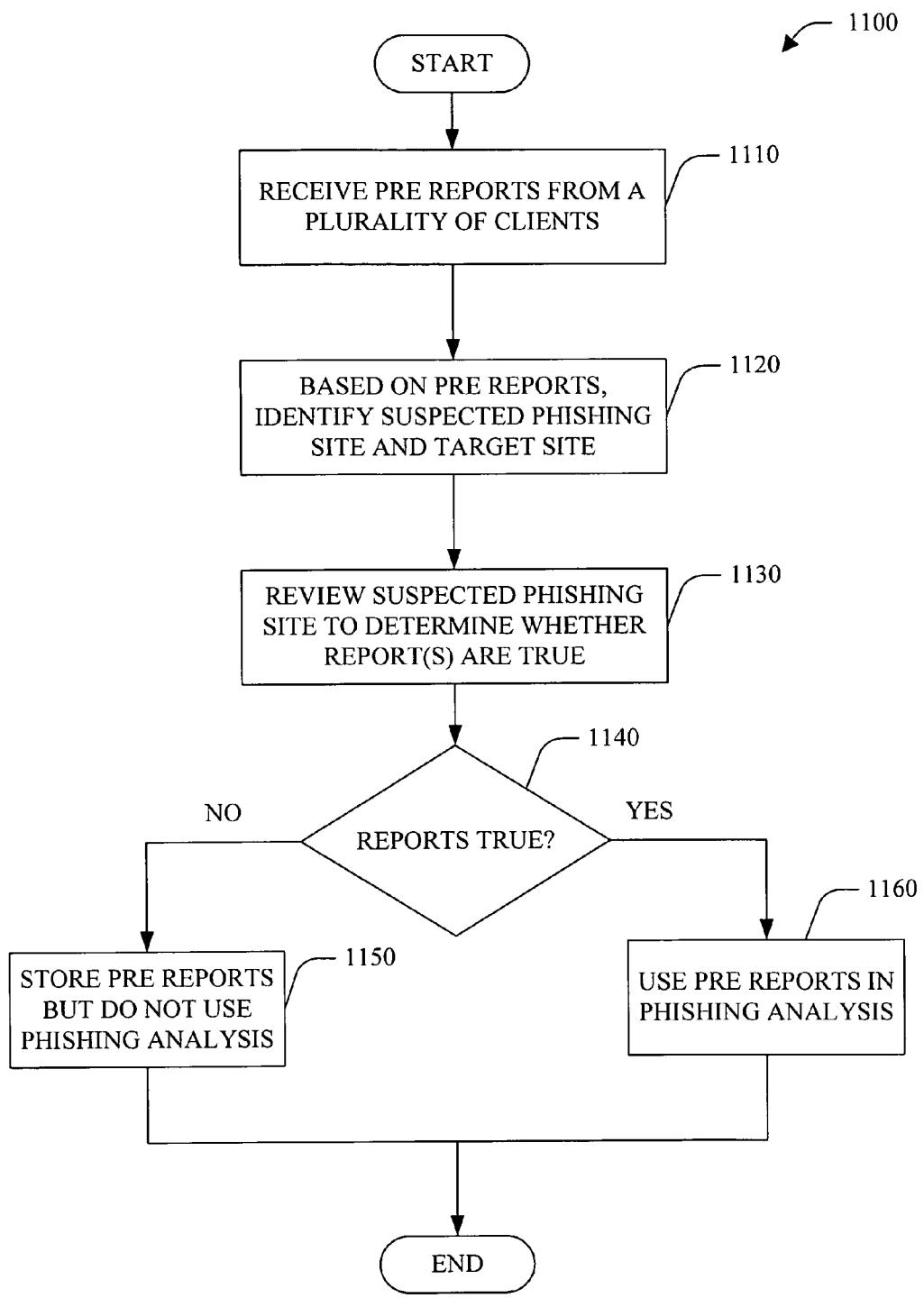
FIG. 11 is a flow chart of a method of detecting phishing.

Referring to FIG. 11, a method of detecting phishing 1100 is illustrated. At 1110, password reuse event reports are received from a plurality of clients. At 1120, a suspected phishing site and target site are identified based on the password reuse event reports. At 1130, the suspected phishing site is reviewed to determine whether the password reuse event reports are true. At 1140, a determination is made as to whether the reports are true.

If the determination at 1140 is NO, the password reuse event reports are stored, but not used in the phishing analysis, and, no further processing occurs. If the determination at 1140 is YES, the password reuse event reports are used in the phishing analysis, and, no further processing occurs.

Figure 12:
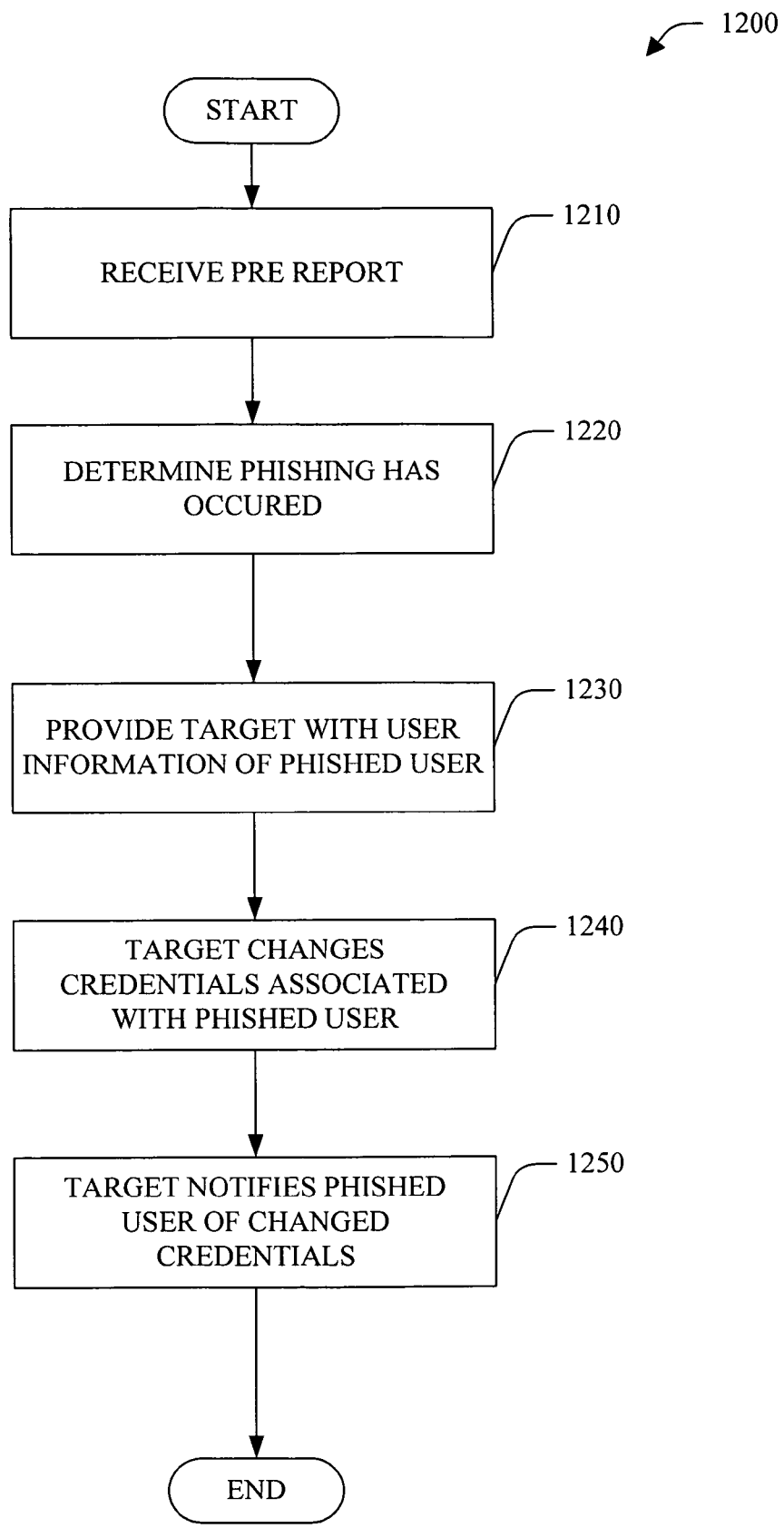
FIG. 12 is a flow chart of a method of detecting phishing.

Next, turning to FIG. 12, a method of detecting phishing 1200 is illustrated. At 1210, a password reuse event report is received. At 1220, it is determined that phishing has occurred.

At 1230, a target is provided with user information of the phished user (e.g., a hash based, at least in part, upon one of a userid, a password, a domain name, source code of a viewed web page, timestamp information from the server component 120, and a time of a previous login at the target (trusted site)). Once informed that particular account is compromised, the target can move to limit the phisher access to the account. For example, at 1240, the target changes credentials associated with the phished user. At 1250, the target notifies the phished user of the changed credentials. For example, the notification can comprise an e-mail with the changed credentials In order to provide additional context for various aspects of the claimed subject matter, FIG. 13 and the following discussion are intended to provide a brief, general description of a suitable operating environment 1310. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

Figure 13:
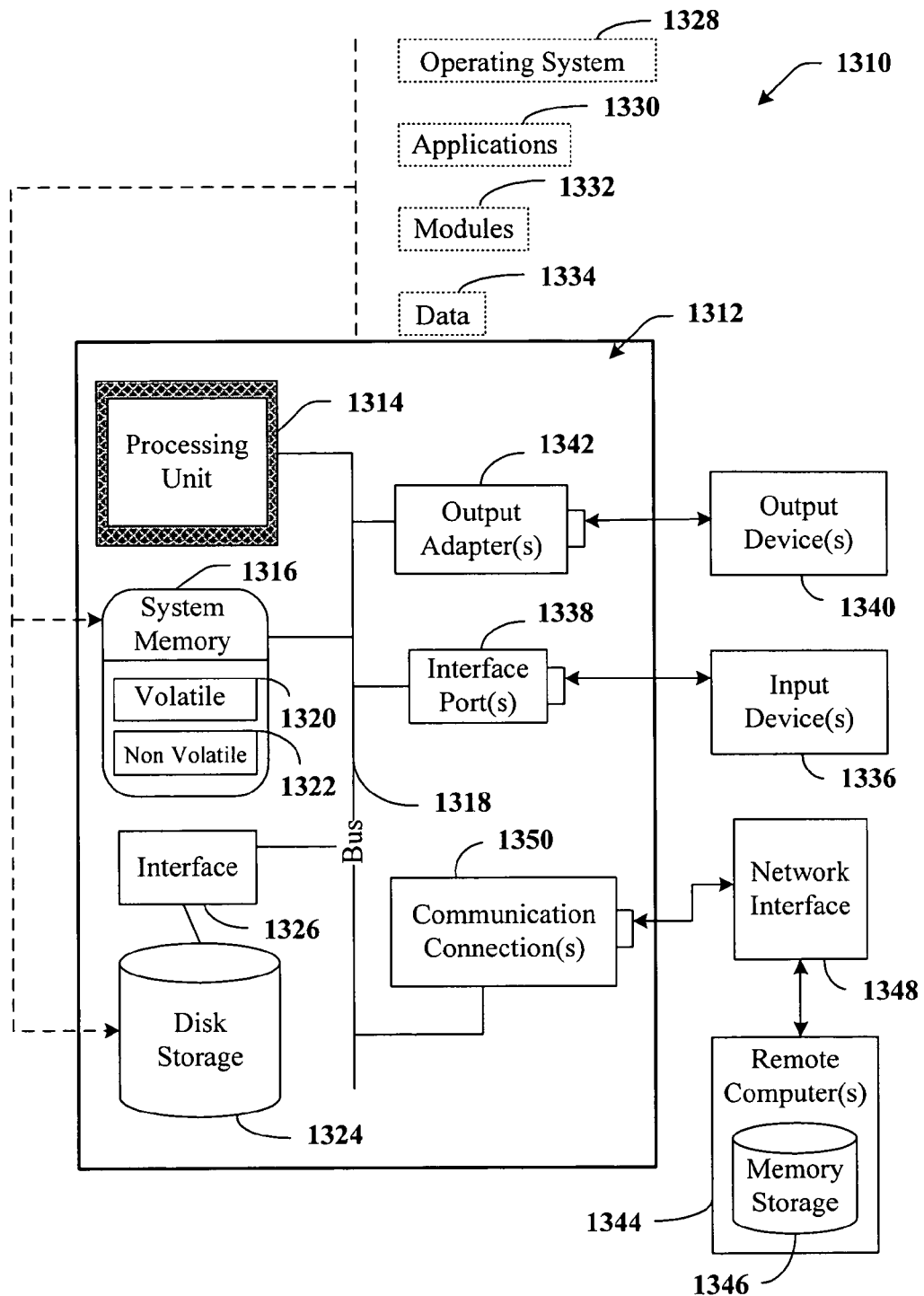
FIG. 13 illustrates an example operating environment.

With reference to FIG. 13, an exemplary environment 1310 includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
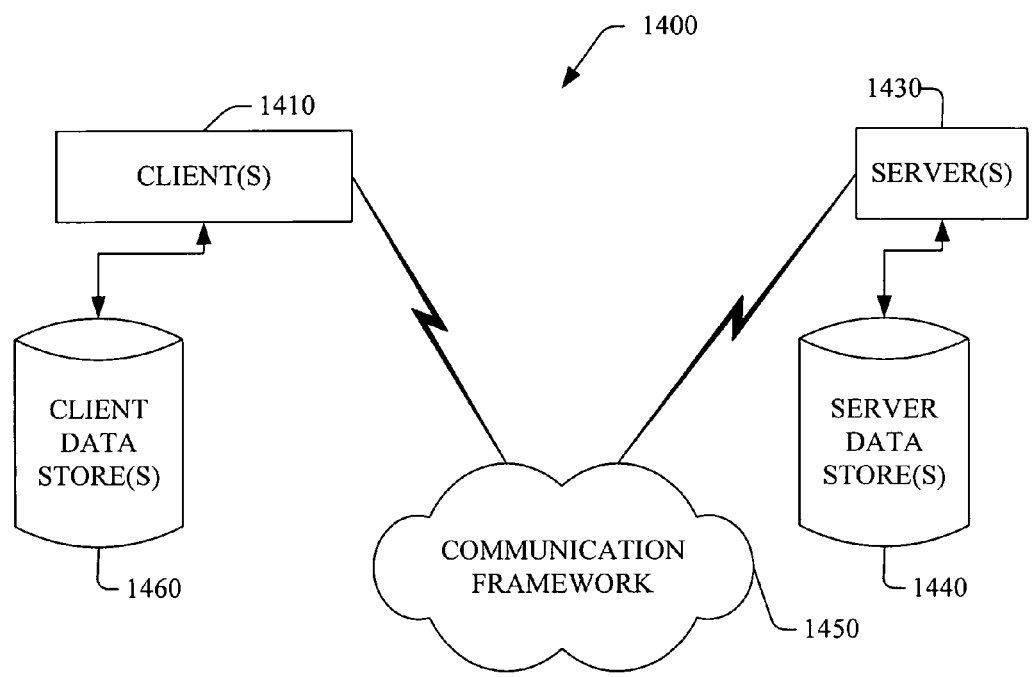
FIG. 14 is illustrates an exemplary networking environment.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices). The servers 1420 can house threads to perform transformations by employing the subject innovation, for example.

One possible communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the servers 1420.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A phishing detection server component comprising:
    a report store that stores information regarding password reuse event reports employed to perform phishing analysis; and,
    a report verification component that receives a password reuse event report comprising a timestamp, the verification component first determining whether the timestamp is genuine, and, if the timestamp is genuine, employs the timestamp to determine whether the report is false, and, if the report is determined to be false, stores an indication that the report is false and not to be employed to perform phishing analysis, a false report comprising at least one of:
        a report received from a phisher; or
        a report received with a timestamp associated with a site subsequently identified as a phishing site.

2. The component of claim 1, further comprising a timestamp generator that generates a unique timestamp associated with the password reuse event report.

3. The component of claim 1, the password reuse event report comprising a plurality of timestamps, each timestamp associated with a time that an associated site was added to a client's protected credential store.

4. The component of claim 3, the report verification component determines the report is false if none of the timestamps is at least a threshold period of time old.

5. The component of claim 3, the report verification component determines the report is false if any of the timestamps has been used in a report in a second threshold period of time.

6. The component of claim 3, the report verification component determines the report is false if any of the timestamps has appeared more than a third threshold quantity of times.

7. The component of claim 3, the report verification component determines the report is false if any of the timestamps were used to report that a site subsequently identified as phishing has a re-use event against an innocent site.

8. The component of claim 1,
    the report verification component verifies with at least one trusted site that a claimed login event has actually occurred,
    the report verification component determines the report is false if the login event is not verified by the trusted site.

9. The component of claim 1, the report verification component determines a likelihood of the password reuse event being false based on learned statistics of password reuse.

10. The component of claim 9, the learned statistics are based, at least in part, upon a geographic location associated with a site associated with the timestamp.

11. The component of claim 1, further comprising a grader that identifies a suspected phishing site and provides a warning to a client component when phishing is suspected, the grader further receiving feedback from the client component as to whether the warning was heeded, the grader employs the feedback in assessing whether the warning was valid.

12. The component of claim 1, the report verification component further receives, after a time of an occurrence of a password reuse event of the report, traffic information with respect to one or more sites and utilizes the traffic information in determining whether the report is false.

13. The component of claim 1, the report comprises a hash based, at least in part, upon one of a userid, a password, a domain name, source code of a viewed web page, timestamp information from the security server, and a time of a previous login at a trusted site.

14. A phishing detection server component comprising:
    a report store that stores information regarding password reuse event reports employed to perform phishing analysis; and
    a report verification component that receives password reuse event reports from a plurality of client components, each report comprising a timestamp,
    the report verification component determining whether one or more of the reports are false, a false report comprising at least one of:
        a report received from a phisher; or
        a report with a timestamp associated with a site subsequently identified as a phishing site,
    the report verification component analyzing an aggregation of the reports to ascertain a suspected phishing site and a target.

15. The component of claim 14,
    the report verification component further examines the suspected phishing site to determine whether one or more of the reports are false;
    when one or more of the reports are determined to be false, the report verification component stores an indication that the one or more reports are false and not to be employed to perform phishing analysis.

16. The component of claim 14, the timestamps being previously provided by the phishing detection server component to the client components for identifying the client components.

17. A computer-implemented method comprising:
    receiving a password reuse event report from a client, the password reuse report comprising information regarding use of a protected credential of the client at a site not corresponding to the protected credential;
    the protected credential having an associated unique token previously provided to the client for the protected credential;
    the password reuse event report received including the token previously provided;
    determining, by a processor, that phishing by a phisher has occurred; providing a target site corresponding to the protected credential with user information of a phished user; and
    changing credentials associated with the phished user at the target site to allow access by the phished user to a trusted site and limit or deny access by the phisher to the trusted site.

18. The method of claim 17, further comprising notifying the phished user of the changed credentials.

19. The method of claim 18, the notifying comprising an e-mail with the changed credentials.

20. The method of claim 17, the information of the password reuse report comprising a hash based, at least in part, upon one of a userid, a password, a domain name, source code of a viewed web page, the token, and a time of a previous login at a trusted site.

* * * * *